(12) United States Patent
Miura et al.

(10) Patent No.: US 11,052,849 B2
(45) Date of Patent: Jul. 6, 2021

(54) VEHICLE MEMBER

(71) Applicant: TOYOTA SHATAI KABUSHIKI KAISHA, Kariya (JP)

(72) Inventors: Toshihisa Miura, Kariya (JP); Kazunari Kojio, Toyota (JP)

(73) Assignee: TOYOTA SHATAI KABUSHIKI KAISHA, Kariya (JP)

( * ) Notice: Subject to any disclaimer, the term of this patent is extended or adjusted under 35 U.S.C. 154(b) by 57 days.

(21) Appl. No.: 16/465,111

(22) PCT Filed: Jul. 19, 2017

(86) PCT No.: PCT/JP2017/026079
§ 371 (c)(1),
(2) Date: May 29, 2019

(87) PCT Pub. No.: WO2018/100791
PCT Pub. Date: Jun. 7, 2018

(65) Prior Publication Data
US 2019/0283698 A1    Sep. 19, 2019

(30) Foreign Application Priority Data

Nov. 30, 2016   (JP) .............................. JP2016-232635

(51) Int. Cl.
| | | |
|---|---|---|
| *B60R 19/34* | (2006.01) | |
| *B29C 45/27* | (2006.01) | |
| *F16F 7/12* | (2006.01) | |
| *B32B 21/08* | (2006.01) | |
| *B29C 45/14* | (2006.01) | |
| *B62D 21/15* | (2006.01) | |
| *B60R 19/26* | (2006.01) | |

(52) U.S. Cl.
CPC .............. *B60R 19/34* (2013.01); *B29C 45/14* (2013.01); *B29C 45/27* (2013.01); *B32B 21/08* (2013.01); *B62D 21/15* (2013.01); *F16F 7/12* (2013.01); *B60R 2019/264* (2013.01)

(58) Field of Classification Search
CPC ................................ B60R 19/34; B62D 21/15
USPC ... 296/146.6, 187.03, 187.04, 187.09, 187.1, 296/187.11, 187.12; 293/102, 132, 133
See application file for complete search history.

(56) References Cited

U.S. PATENT DOCUMENTS

| | | | |
|---|---|---|---|
| 5,306,068 A | * | 4/1994 | Nakae .................... B60J 5/0441 296/187.12 |
| 5,863,479 A | | 1/1999 | Ohsumi et al. |
| 2013/0306419 A1 | | 11/2013 | Okuda |

FOREIGN PATENT DOCUMENTS

| | | |
|---|---|---|
| DE | 41 20 897 A1 | 1/1992 |
| JP | 2006-347265 A | 12/2006 |
| JP | 2010-94827 A | 4/2010 |
| JP | 2014-184899 A | 10/2014 |

(Continued)

*Primary Examiner* — Joseph D. Pape
(74) *Attorney, Agent, or Firm* — Christensen, Fonder, Dardi & Herbert PLLC (57) ABSTRACT

A vehicle member comprises a wooden member and a resin cover member integrally covering the wooden member. The vehicle member absorbs or transmits a received load. The cover member integrally includes a load acting portion and an attaching portion. The wooden member is positioned in the vehicle member so that a shaft center direction of annual rings is aligned with an input direction of the load. The attaching portion is attachable to an attached member of a vehicle.

8 Claims, 9 Drawing Sheets

(56) References Cited

FOREIGN PATENT DOCUMENTS

| WO | WO 2012/073680 A1 | 6/2012 |
| WO | WO 2013/080864 A1 | 6/2013 |

\* cited by examiner

VEHICLE MEMBER

CROSS-REFERENCE TO RELATED APPLICATIONS

The present application is a 35 U.S.C. § 371 National Phase entry of, and claims priority to, PCT Application No. PCT/JP2017/026079, filed Jul. 19, 2017, which in turn claims priority to Japanese Patent Application No. 2016-232635, filed Nov. 30, 2016, both of which are hereby incorporated herein by reference in their entireties for all purposes.

STATEMENT REGARDING FEDERALLY SPONSORED RESEARCH OR DEVELOPMENT

Not applicable.

BACKGROUND

The present disclosure relates to a vehicle member that comprises a wooden member and a cover member covering the wooden member. The vehicle member absorbs or transmits a load while receiving the load.

General vehicles may have a vehicle member configured to receive a load generated in a vehicle crash and then absorb or transmit the load. For example, bumper reinforcement members and side members are attached to a front of the vehicle. Between the bumper reinforcement members and the side members, a tubular-shaped vehicle member may be disposed. The vehicle member receives an impact load applied to the bumper reinforcement member in a vehicle crash and then absorbs the impact load by collapsing in an axial direction. Alternatively, a prism-shaped vehicle members may be disposed in a vehicle-width direction in an interior of the side doors. In this case, the relevant vehicle member receives an impact load applied to the side doors in the vehicle crash and then transmits the impact load to the reinforcement members located in a vehicle interior.

The above-mentioned vehicles member have a wooden member inside. The impact load of the vehicle crash can mainly be received by the wooden member. Efficiency of these kinds of wooden members can greatly change depending on usage environment. For example, the wooden member can become harder and crack due to aridity. On the contrary, the wooden member can become softer due to excessive moisture. Thus, exposure of the wooden member to the outside environment should be kept to a minimum to prevent degradation of the wooden member's efficiency to receive or transmit the load. For example, the wooden member can be covered in a metal cover member. However, this causes an increase of the weight of the vehicle member. According to Japanese Unexamined Patent Application Publication No. 2010-94827, a resin base is molded and integrated with a flat plate wooden member by an injection insert molding. Thus, the art disclosed in Japanese Unexamined Patent Application Publication No. 2010-94827 can be used to cover the wooden member with a resin cover member. Accordingly, degradation of the wooden member due to changes in the usage environment may be substantially avoided. Additionally, the weight of the vehicle member may be lighter.

BRIEF SUMMARY

The wooden member in the vehicle member described above is not orientated in the cover member in a way to receive enough of the impact load. Further, attachability of the wooden member to the vehicle is awaited to be improved. For example, if the wooden member is positioned in the cover member inappropriately, the cover member can collapse due to an unexpected low load applied an unanticipated direction. However, the positioning of the wooden member and the attachability of the wooden member to the vehicle disclosed in Japanese Unexamined Patent Application Publication No. 2010-94827 are not considered enough. Thus, the art cannot be easily applied to the vehicle member. Accordingly, a vehicle member allowing the wooden member to be positioned appropriately in the vehicle member and allowing attachability to the vehicle needs to be improved.

In the first aspect of the present disclosure, a vehicle member comprises a wooden member and a resin cover member integrally covering the wooden member. The vehicle member absorbs or transmits a received the load. With regards to this kind of the vehicle members, the wooden member is desired to locate in the cover members to adequately receive the loads. Additionally, an improved attachment of the vehicle member to the vehicle is desired. Thus, the cover member integrally includes a load acting portion and an attaching portion, the attaching portion being attachable to an attached portion within a vehicle. Further, the wooden member is positioned in the cover member so that a shaft center direction of annual rings of the wooden member is aligned with an input direction of the load. In this aspect, the wooden member is disposed in the load acting portion so that the shaft center direction of the annual rings is aligned with the input direction of the load. Thus, the wooden member disposed in the load acting portion can absorb or transmit the received load. Additionally, the attaching portion is integrally formed with the load acting portion. Thus, attachment of the vehicle member to the vehicle can improved.

In the second aspect of the present disclosure, the load acting portion in the first aspect has a pillar shape extending in the input direction of the load. Additionally, the attaching portion has a flange shape extending outward from outer peripheral surfaces of the load acting portion. In the present aspect, the attaching portion has the flange shape extending outward from the outer peripheral surfaces of the load acting portion. Thus, the attaching stability of the vehicle member to the attached member of the vehicle can be improved by the attaching portion having the appropriate shape. For example, this can suitably prevent misalignment of the load acting portion, and thus, the loading acting portion can appropriately receive the impact load during the vehicle crash.

In the third aspect of the present disclosure, the wooden member in the first or second aspect has a density ranging from 0.2 g/cm$^3$ to 0.6 g/cm$^3$. The use of a relatively low density wooden member can improve the impact absorption efficiency of the vehicle member in the present aspect.

In the fourth aspect of the present disclosure, the wooden member in the first or second aspect has a density ranging from 0.6 g/cm$^3$ to 1.0 g/cm$^3$. The use of a relatively high density wooden member can improve the load transmission efficiency of the vehicle member in the present aspect.

DETAILED DESCRIPTION

Figure 8:
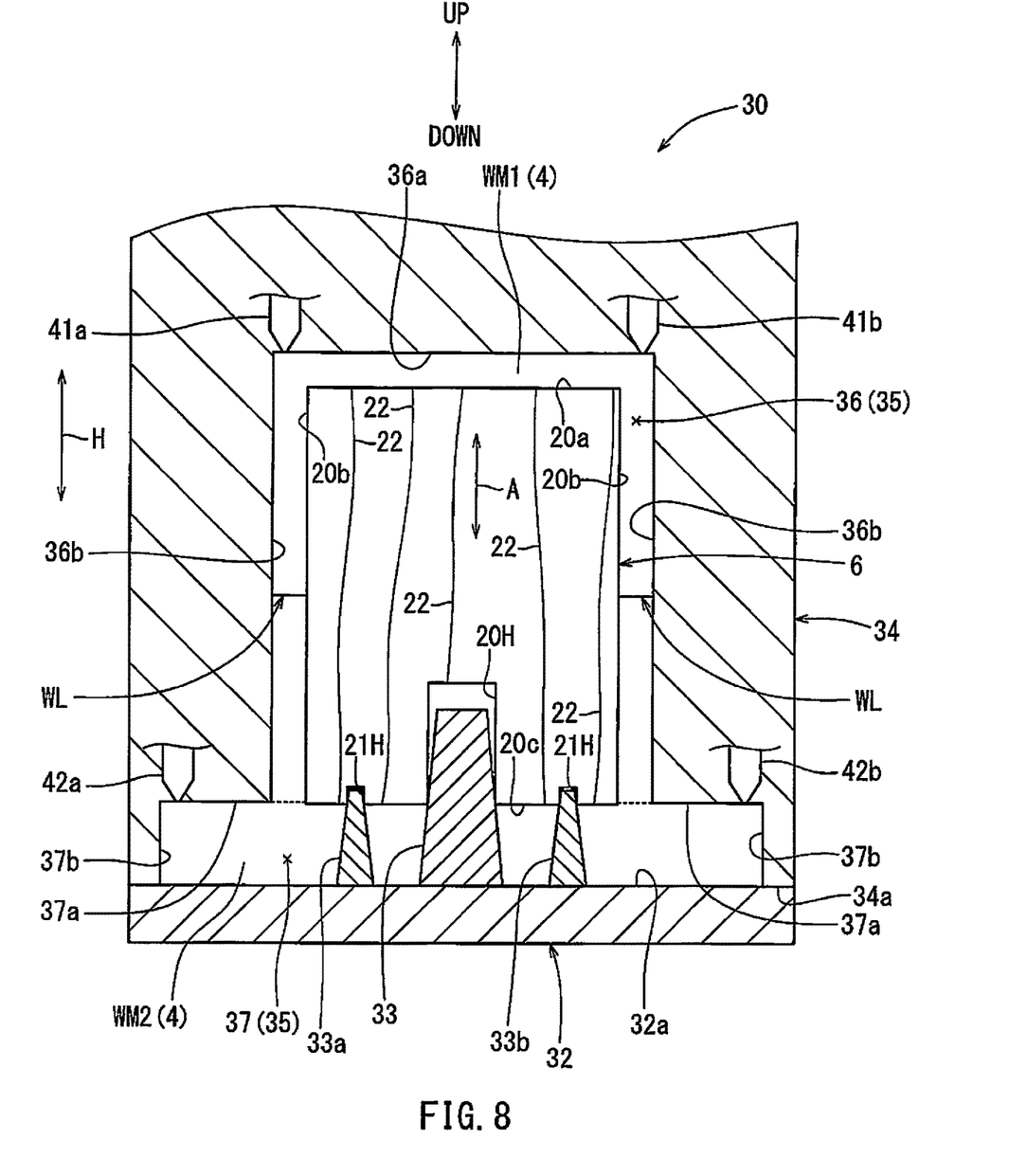
FIG. 8 is a cross-sectional view showing schematically the injection molding machine according to a modification.
Figure 9:
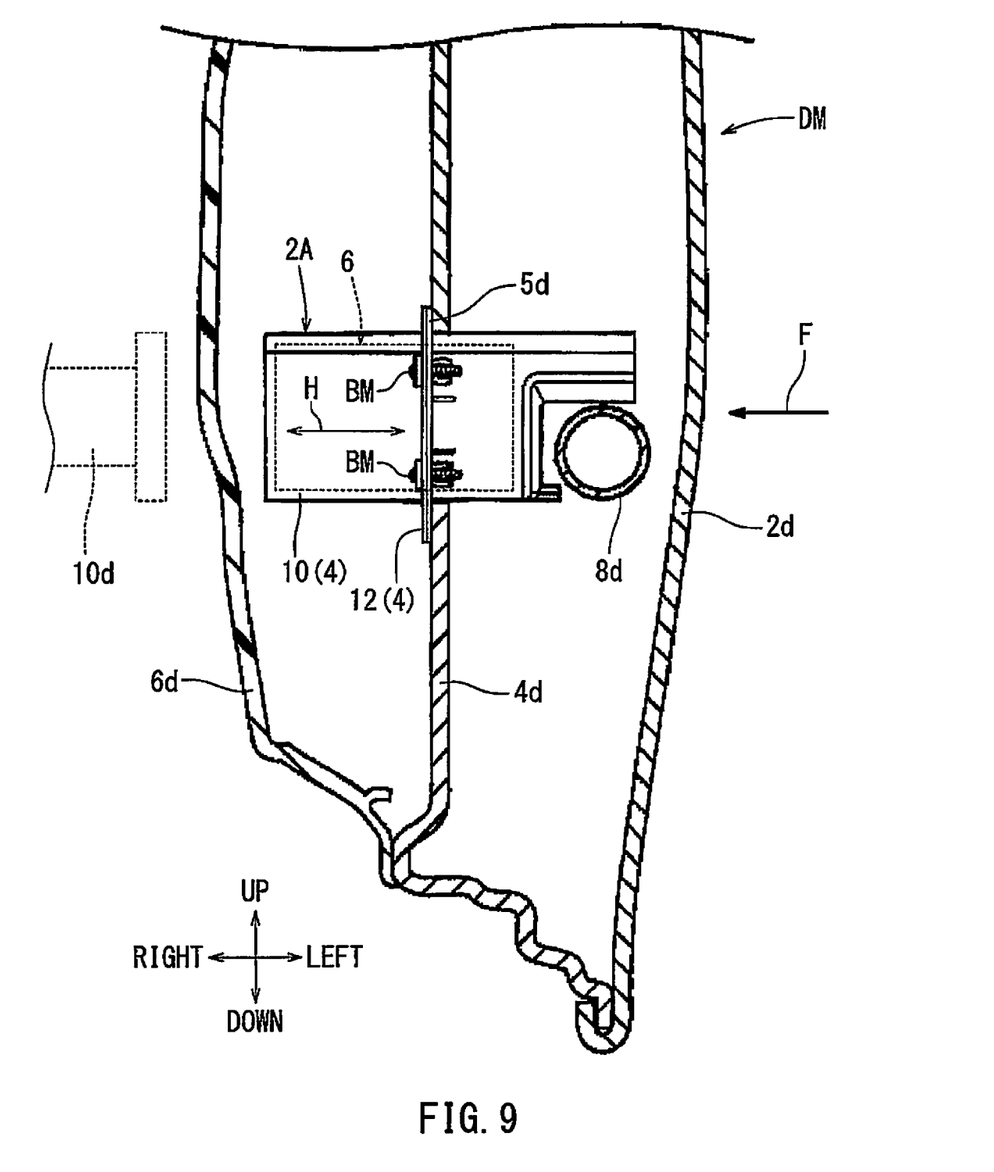
FIG. 9 is a cross-sectional view of a part of the vehicle according to a second embodiment.

Modes for carrying out embodiments of the present disclosure are described below with reference to FIGS. 1 to 9. Arrows indicating an axial direction H (an input direction of the load prior to attachment to a vehicle) of a load acting portion and arrows indicating a shaft center direction A of annual (growth) rings of a wooden member are shown in each figure on a case-by-case basis. Further, arrows indicating a front-to-rear direction, a left-to-right direction, and an up-to-down direction of the vehicle are shown in FIGS. 2 and 9 on a case-by-case basis. Additionally, arrows indicating an up-to-down direction of an injection molding machine are shown in FIGS. 5 to 8. It is noted that FIGS. 5 to 8 are schematic cross-sectional views illustrating potential positions of each injection openings of the injection molding machine to illustrate positional relations of the each injection openings relative to the wooden member.

Embodiment 1

Figure 1:
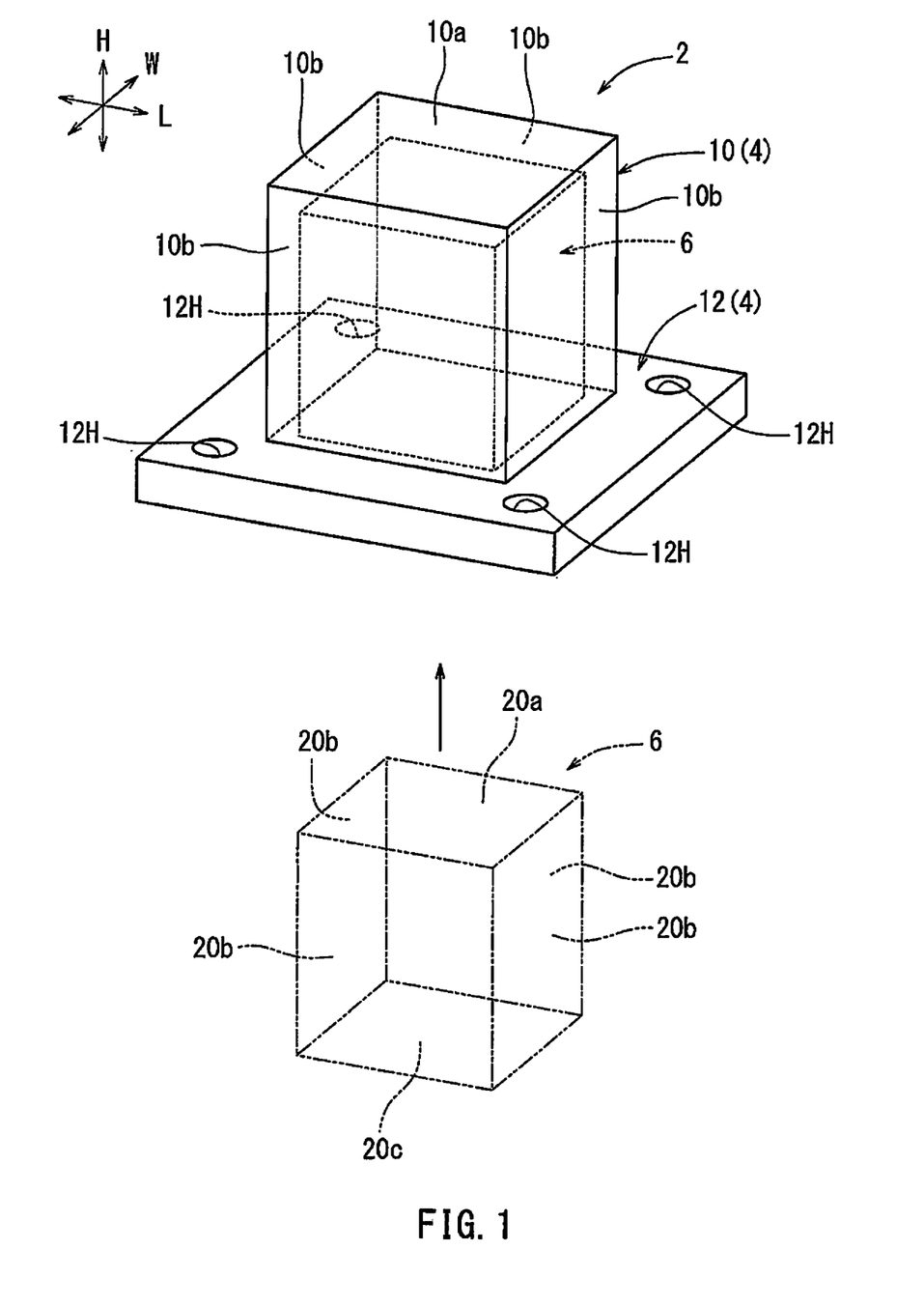
FIG. 1 is a perspective view of a vehicle member.
Figure 2:
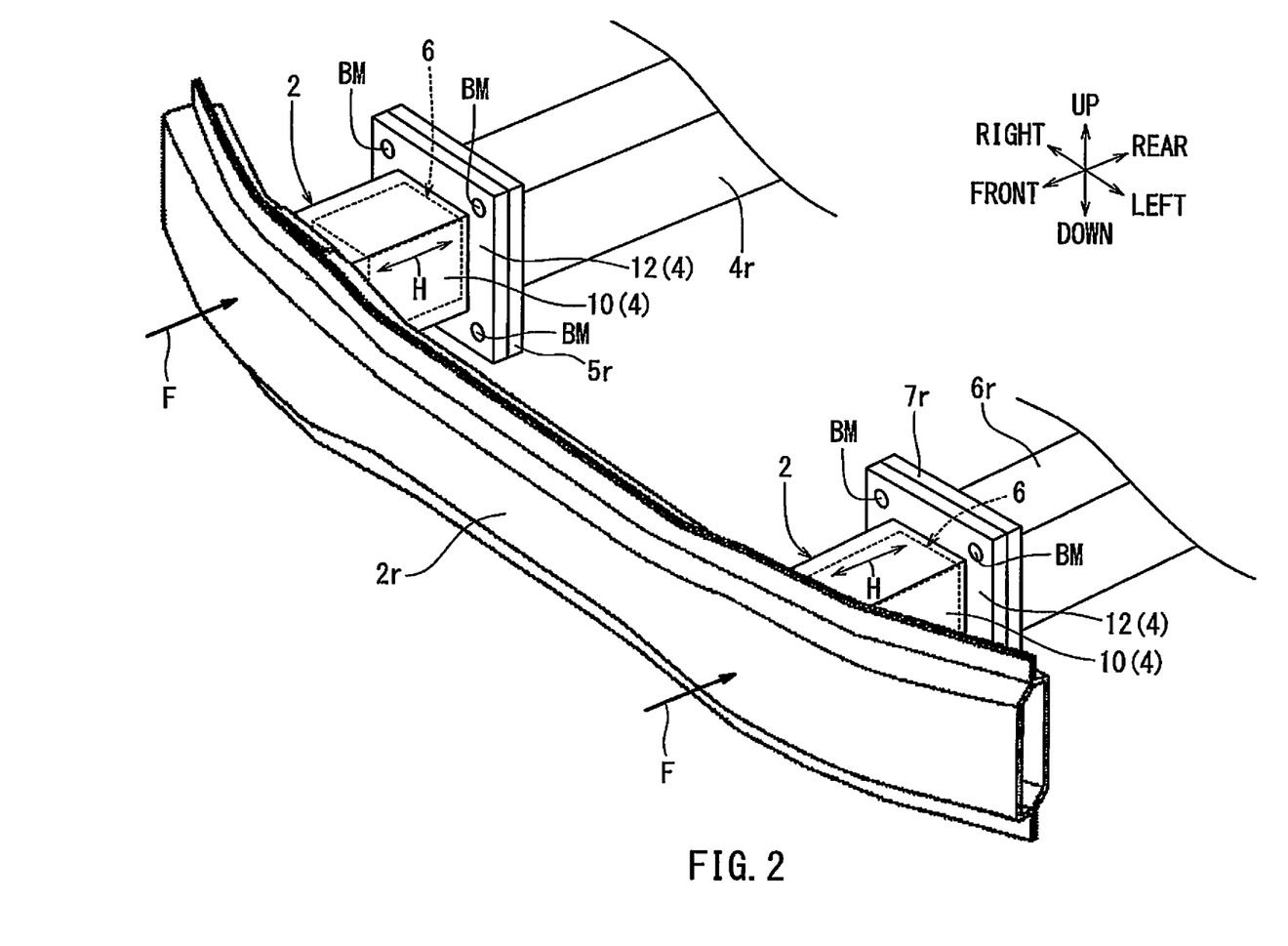
FIG. 2 is a perspective view of a part of a vehicle.

The vehicle member 2 illustrated in FIG. 1 may be used as an impact absorption member, which absorbs an impact load during a vehicle crash. The vehicle member 2 may include a wooden member 6 and a cover member 4 covering the wooden member 6 with a resin (details of each members are described below). With reference to FIG. 2, this vehicle member 2 may be disposed between a bumper reinforcement member 2r and right and left side members 4r and 6r, described below. The right and left vehicle members 2 may receive impact loads F applied to the bumper reinforcement member 2r. Subsequently, the wooden members 6 covered by the cover members 4 may be compressed and collapsed, thus absorbing the impact loads F. With regards to these kinds of the vehicle members 2, it is desirable to appropriately position the wooden members 6 in the cover members 4 so that enough of the load may be absorbed. Additionally, improved attachment of the vehicle members 2 to the vehicle is desired. In the present embodiment, arrangements described below may allow the wooden members 6 to be located appropriately in the cover members 4. The arrangements described below may improve the attachment of the vehicle members 2 to the vehicle. Details of arrangements for each embodiment are described below.

[Cover Member and Load Acting Portion]

Figure 3:
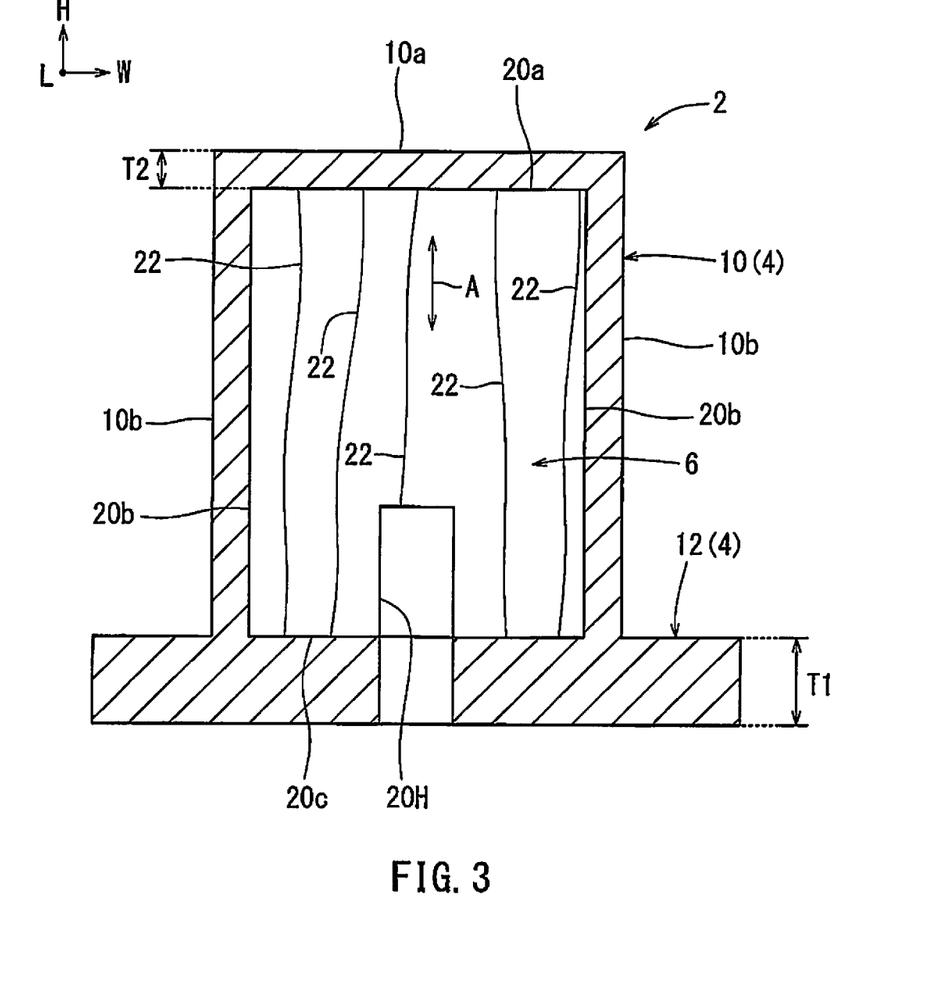
FIG. 3 is a longitudinal cross-sectional view of the vehicle member.

With reference to FIGS. 1 and 3, the cover member 4 forms an outer shape of the vehicle member 2 and covers the wooden member 6, described below, as a single piece of resin. The cover member 4 has a load acting portion 10 and an attaching portion 12. As illustrated in FIG. 2, the cover members 4 may be attached to the side members 4r and 6r, described below, which are attached members. The load acting portion 10 has a substantially square prism shape and includes the wooden member 6, described below, inside. The load acting portion 10 has a substantially quadrangle input end face 10a and four acting portion side faces 10b. The input end face 10a is arranged to be perpendicular to the axial direction H of the load acting portion and arranged at an edge of the load acting portion 10 in the axial direction H. The acting portion side faces 10b extend from each side of the input end face 10a in the axial direction H. The acting portion side faces 10b correspond to outer peripheral surfaces of the load acting portion 10 of the present disclosure.

In the present embodiment, the axial direction H of the load acting portion 10 may be set to align with the front-back direction, which is a load input direction, when the vehicle member 2 is attached to the vehicle. That is, before the vehicle member 2 is attached to the vehicle, the axial direction H of the load acting portion 10 can be considered the "load input direction." In a vehicle crash, described below, the impact is input to the input end face 10a of the cover member 4. This impact load may crush and deform each of the acting portion side faces 10b and the wooden member 6, described below, in the axial direction H of the load acting portion.

[Attaching Portion]

The attaching portions 12 are attachable to each of the side members 4r and 6r, described below. The attaching portion 12 may be formed integrally with the cover member 4 and may be positioned at an opposite end to the input end face 10a of the load acting portion 10. That is, the attaching portion 12 may be formed as part of an end of the cover member 4. The attaching portion 12 may have a substantially quadrangle flange shape and may extend outward (in the L direction and W direction shown in FIG. 1) from each acting portion side face 10b of the load acting portion 10. The attaching portion 12 may include fastener holes 12H formed at its four corners. Bolt materials BM as fastening tools may be inserted into the fastener holes 12H. With reference to FIG. 3, the thickness dimension T1 of the attaching portion 12 may be the same as the thickness dimension T2 of the load acting portion 10. However, the thickness dimension T1 is preferably larger than the thickness dimension T2 of the load acting portion 10 to improve an attaching stability to the side members 4r and 6r.

The cover member 4 may be made from a resin, such as thermoplastic resins or thermohardening resins. Such thermoplastic resins, for example, may include polyolefin resins such as polypropylene and polyethylene, polycarbonate resins, polyester resins such as polyethylene terephthalate, polybutylene terephthalate, poly (ethylene-2, 6-naphthalate) and nylon (polyamide), propylene-ethylene copolymer, polystyrene resins, copolymers of aromatic vinyl monomers and (metha) acryl acid alkyl esters having lower alkyl group(s), terephthalic acid-ethylene glycol-cyclohexane-dimethanol copolymer, and (metha) acryl resins such as polymethyl methacrylate. Such thermohardening resins, for example, may include phenol resins, epoxy resins, melamine resins, or urea resins. The thermoplastic resins or the thermohardening resins may be used independently or as a mixture of two or more kinds of resin.

[Wooden Member]

Figure 4:
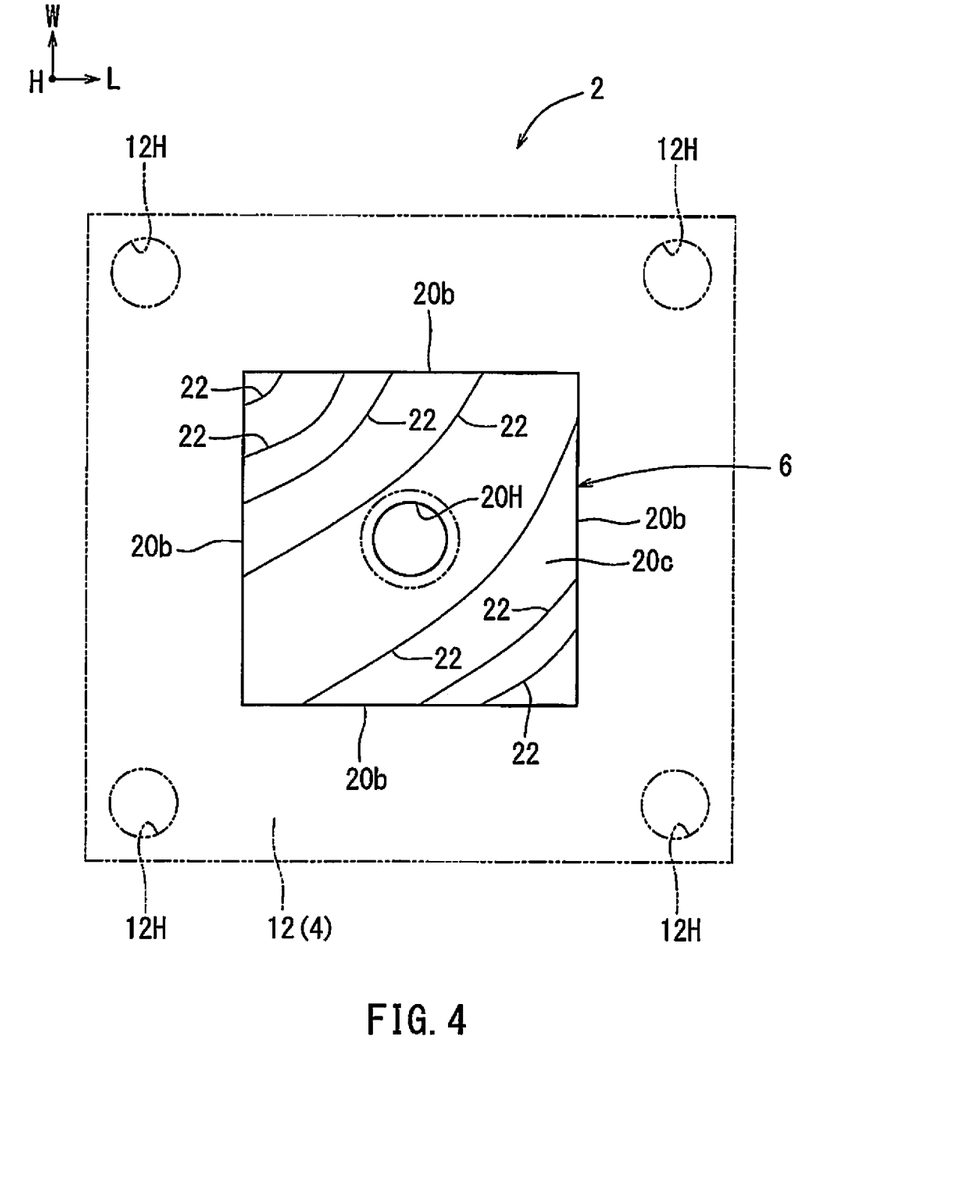
FIG. 4 is a perspective rear view from an attaching portion side of the vehicle member.

With reference to FIGS. 1 and 3, the wooden member 6 is a core of the vehicle member 2. The wooden member 6 may collapse due to an impact load applied in the axial direction H of the load acting portion, which is the load input direction in a vehicle crash. In FIG. 3, the wooden member 6 has a square-prism shape. This cross-sectional shape (a cross-sectional shape in the W-to-L direction) of the wooden member 6 has substantially a quadrangle shape. The wooden member 6 has a one end face 20*a*, four side faces 20*b*, and one other end face 20*c*. The one end face 20*a* is arranged at the input end face 10*a* side of the load acting portion 10. The impact load may be input to the one end face 20*a*. Each side face 20*b* may extend in the axial direction H and from each side of the one end face 20*a*. The other end face 20*c* is located at an end opposite to the end face 20*a* of the wooden member 6. With reference to FIG. 4, the other end face 20*c* has an insert hole 20H formed at the center where a retaining pin 33 of the injection molding machine 30 illustrated in FIG. 5 can be inserted, as described in greater detail below. The insert hole 20H is substantially a tubular-shaped hole (non-through hole) and has a depth dimension that is substantially the same as a length of the retaining pin 33, described below.

With reference to FIG. 3, the wooden member 6 is disposed in the load acting portion 10 in a state in which the resin of the load acting portion 10 fully covers the wooden member 6. Thus, a height dimension (a dimension in the axial direction H), a length dimension (a dimension in the L direction) and a width dimension (a dimension in the W direction) of the wooden member 6 are slightly smaller than the corresponding outer dimensions of the load acting portion 10. Furthermore, the wooden member 6 is adequately aligned in the cover member 4 so that a shaft center direction A of the annual rings 22 is substantially aligned with the axial direction H of the load acting portion 10. In this way, if a load smaller than that generated in the vehicle crash is applied to the vehicle member, this alignment of the wooden member 6 in the cover member 4 allows the wooden member 6 to absorb the smaller load without being compressed or collapsed.

This kind of the wooden member 6 may be formed from conifers, such as cedar, hinoki cypress, and pine, or broad-leaf trees, such as zelkova and fagaceae. Preferably, the wooden member 6 may be formed from conifers that have annual rings 22 that are relatively sharp. Further, the density of the wooden member 6 is not particularly limited. However, for example, the density of the wooden member 6 may range from 0.2 $g/cm^3$ to 1.0 $g/cm^3$. Especially when the vehicle member 2 is used as an impact absorption member, a low-density wooden member 6, which has a superior impact absorption efficiency, may preferably be used. For example, the density of the wooden member 6 in this case may range from 0.2 $g/cm^3$ to 0.6 $g/cm^3$. If a relatively high-density wooden member 6 is used, the desired impact absorption efficiency can be obtained by decreasing the cross-sectional area of the wooden member 6, thereby making the wooden member 6 collapse easier.

The moisture content of the wooden member is not particularly limited, if the desired impact absorption efficiency can be obtained. The moisture content may typically range from 5 to 16%. The moisture content may be set around 10% as a standard. Preferably, the moisture content may be set to around 8%. For example, the moisture content of the wooden member 6 can be adjusted to range roughly from 8% to 10% by placing the wooden member 6 for a predetermined time in a room where the temperature is around 30 degrees Celsius and the humidity is around 90%. Furthermore, the moisture content of the wooden member 6 can be calculated, for example, from the difference of the weights between the wooden member 6 dried in the above-mentioned method and the wooden member 6 prior to being dried.

[Method for Manufacturing the Vehicle Member]

A manufacturing method of the vehicle member 2 is not particularly limited. However, in the present embodiment, the vehicle member 2 may be manufactured by using the injection molding machine 30 illustrated in FIG. 5. The manufacturing method includes a first step and a second step described infra. The injection molding machine 30 has a core mold 32, a cavity mold 34, a cavity 38, and injection openings (first injection openings 41*a* to 41*d* and second injection openings 42*a* and 42*b*) shown in FIG. 6. The core mold 32 may be fixed at a predetermined position. When the cavity mold 34 is moved down toward the core mold 32, both the core mold 32 and the cavity mold 34 can be in a mold closing state. The cavity 38 is formed by the core mold 32 and the cavity mold 34 being in the mold closing state.

Figure 5:
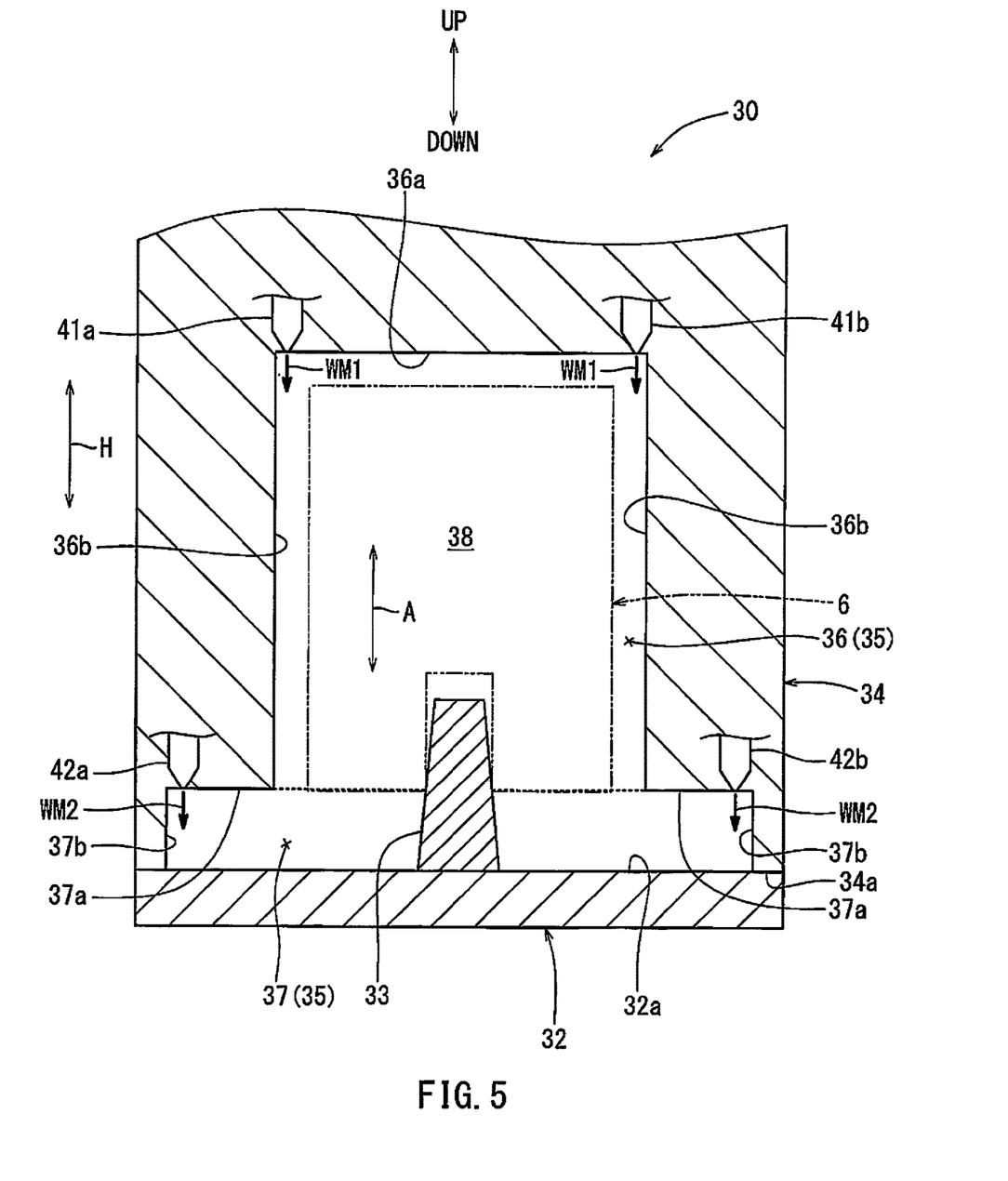
FIG. 5 is a cross-sectional view showing schematically an injection molding machine.

With reference to FIG. 5, the core mold 32 is a flat plate mold disposed at, for example, the floor. The core mold 32 has a core-side closure surface 32*a* formed substantially flat and a retaining pin 33. The retaining pin 33 rises upward from the core-side closure surface 32*a*. The retaining pin 33 may be fitted into the wooden member 6 at the first step, described below. Further, the retaining pin 33 may have a tapered outer periphery. A radius of the tapered outer periphery gradually increases from the tip portion forming an upper edge of the retaining pin 33 to the core-side closure surface 32*a*, which is located at the injection molding machine side. The tip portion side of the retaining pin 33 can be fitted into the insert hole 20H of the wooden member 6 as shown in FIG. 3. As described above, the radius of the retaining pin 33 increases gradually toward a bottom of the retaining pin 33 and, thus, the retaining pin 33 can be partially fitted into the insert hole 20H. However, a lower edge of the bottom of the retaining pin 33 cannot be fitted into the insert hole 20H.

Figure 6:
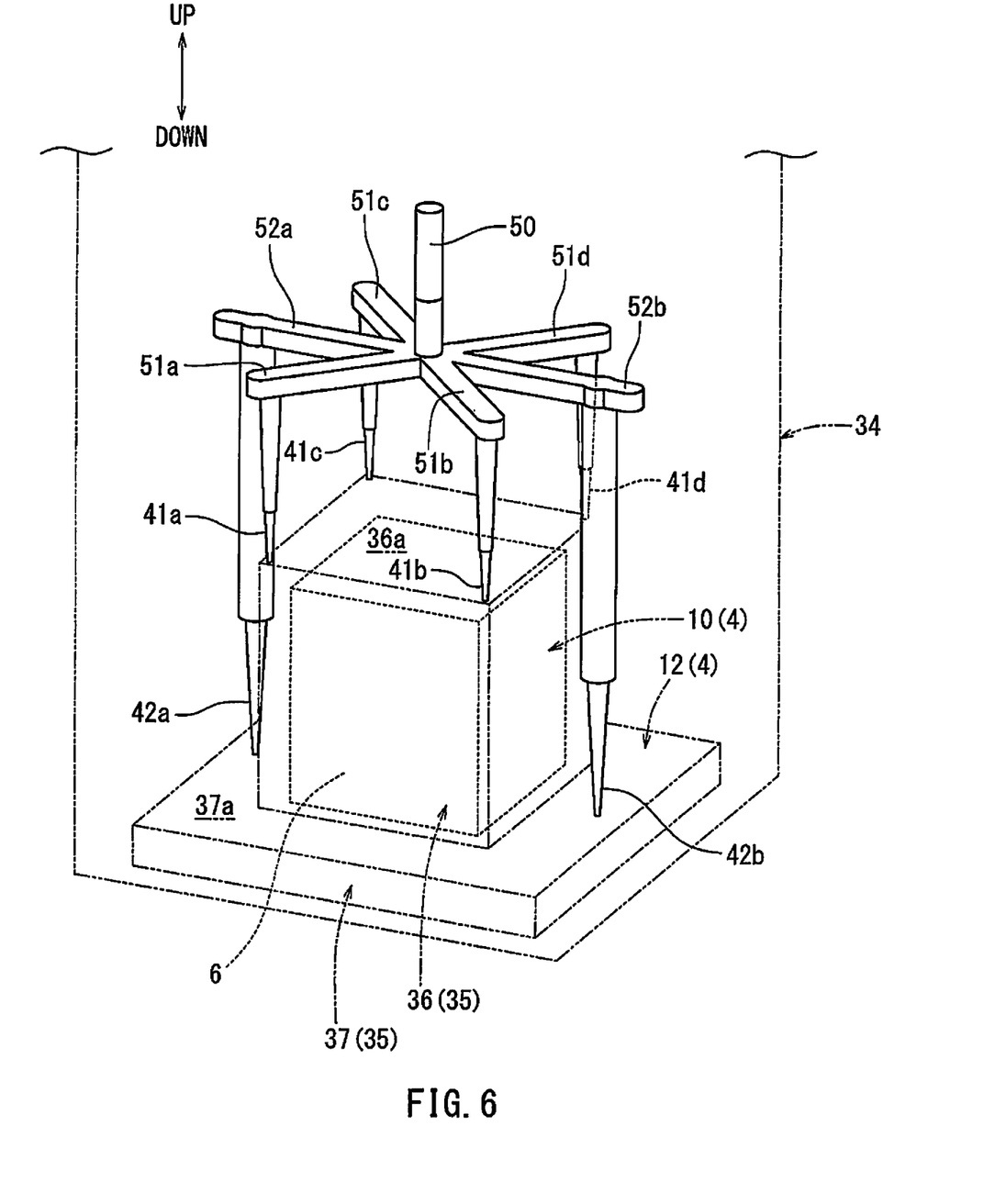
FIG. 6 is a perspective view showing schematically a part of the injection molding machine.

With reference to FIG. 5, the cavity mold 34 is a rectangular-cuboid mold disposed to rise and fall relative to the core mold 32. The cavity mold 34 has a cavity-side closure surface 34*a* that may face the core-side closure surface 32*a* and has a concave-shaped molding recess portion 35 formed in the cavity-side closure surface 34*a*. The cavity-side closure surface 34*a* can be closed by the core-side closure surface 32*a*. The molding recess portion 35 is formed in the shape of the cover member as shown in FIG. 6. The molding recess portion 35 can be compartmentalized to a first portion 36 forming an upper side (inner side) and a second portion 37 forming the lower side (opening side). The first portion 36 corresponds to a cavity where the load acting portion is formed, as illustrated in FIG. 3. With reference to FIG. 5, the first portion 36 is a substantially square prism-shape space surrounded by an inner-side upper surface 36*a* and four inner-side peripheral surfaces 36*b* (for convenience, only two inner-side peripheral surfaces are shown in FIG. 5). The inner-side upper surface 36*a* is substantially a quadrangle surface forming a bottom of the molding recess portion 35. Each inner-side peripheral surfaces 36*b* extend downward from each sides of the inner-side upper surface 36*a*. The second portion 37 corresponds to a cavity where the attaching portion 12, shown in FIG. 3, is formed. With reference to FIG. 5, the second portion 37 has a substantially square prism shape and is surrounded by an opening-side upper surface 37*a* and four opening-side peripheral surfaces 37*b*. The second portion 37 is larger in width and smaller in depth in comparison with the first portion 36 (for convenience, only two opening-side peripheral surfaces are shown in FIG. 5). The opening-side upper surface 37*a* is a quadrangle surface arranged parallel to the inner-side upper surface 36*a*. Each opening-side peripheral surface 37*b* extends downward from each sides of the opening-side upper surface 37*a*.

Figure 7:
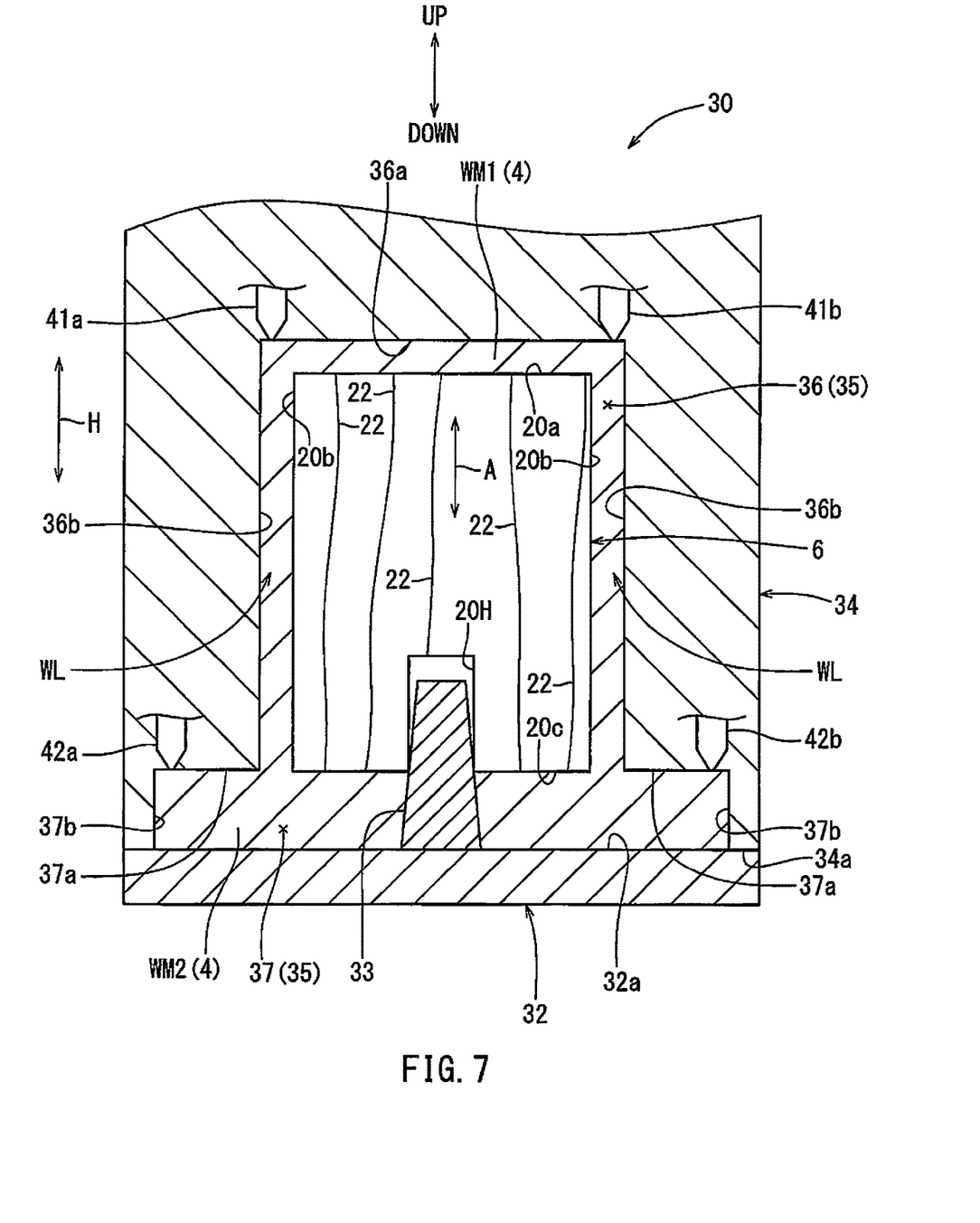
FIG. 7 is a cross-sectional view showing schematically the injection molding machine when a cover member is formed.

With reference to FIGS. 5 and 7, the cavity 38 is a molding space where the cover member 4 is formed so that the axial direction H of the load acting portion is aligned with the up-to-down direction. The cavity 38 is formed between the core-side closure surface 32a of the core mold 32 and the surfaces of the molding recess portion 35. The retaining pin 33, which is positioned to rise upward from the core-side closure surface 32a, is disposed in the cavity 38 so that the retaining pin 33 projects in the up-to-down direction. The retaining pin 33 may be inserted into the wooden member 6, as described below. In this way, the wooden member 6 is disposed in the cavity 38 so as to be locate between the inner-side upper surface 36a of the first portion 36 and the opening-side upper surfaces 37a of the second portion 37. Consequently, the inner-side upper surface 36a is located at an upper end side (the one end face 20a side of the wooden member). The opening-side upper surfaces 37a of the second portion 37 is located at a lower end side of the wooden member 6 (the other end face 20c side of the wooden member 6).

With reference to FIG. 6, the injection openings (the first injection openings 41a to 41d and the second injection openings 42a and 42b) are gates provided in the cavity mold 34 side. Molding materials may be injected into the cavity 38 via the gates. The first injection openings 41a to 41d are open at the inner-side upper surface 36a of the first portion 36 and are disposed at the upper edge side of the wooden member 6 now located in the cavity 38 at the second step, described below. Each of the first injection openings 41a to 41d may communicate with a spool 50 via corresponding first runners 51a to 51d disposed in the cavity mold 34 respectively. Each of the first runners 51a to 51d are arranged in the cavity mold 34 so that the first runners 51a to 51d form a cross shape relative to the spool 50, when seen from above. Additionally, each of the first runners 51a to 51d may communicate with the first injection openings 41a to 41d, respectively, at end sides thereof and extending downward. Further, the first injection openings 41a to 41d are positioned at the four corners of the inner-side upper surface 36a. The four corners are offset outward from the peripheral surfaces (e.g. side faces 20b) of the wooden member 6. Furthermore, the first injection openings 41a to 41d are arranged not to overlap with the wooden member 6 in the up-to-down direction. Each of the first injection openings 41a to 41d shown in FIG. 6 can inject a molding material WM1 downward as shown in FIG. 5 (for convenience, only a part of the injection openings is shown in FIG. 5; the arrows associated with symbols WM1 and WM2 indicate the injection directions of each molding material).

With reference to FIG. 5 and FIG. 6, a pair of the second injection openings 42a and 42b are open at the opening-side upper surface 37a of the second portion 37. The pair of the second injection openings 42a and 42b are disposed at a lower edge side of the wooden member 6 in the cavity 38, at the second step described below. Each of the second injection openings 42a and 42b may communicate with the spool 50 via second runners 52a and 52b, respectively, in the cavity mold 34. Each second runner 52a and 52b may be arranged in the cavity mold 34 so that the runners 52a and 52b place the spool 50 therebetween and are symmetric with respect to the spool 50. Each of the runners 52a and 52b may communicate with the second injection openings 42a and 42b at end sides extending downward. The second injection openings 42a and 42b are separately disposed at the opening-side upper surface 37a, which is offset outward from the peripheral surfaces (e.g. side faces 20b) of the wooden member 6. Furthermore, each of the second injection openings 42a and 42b can inject a molding material WM2 downward, as shown in FIG. 5.

[First Step]

With reference to FIGS. 5 and 7, a wooden member 6 is introduced onto the retaining pin 33, which projects into and is disposed at the cavity 38, of the injection molding machine 30. In this way, the wooden member 6 can be retained in the cavity 38 in a suspended state. In the present embodiment, prior to closing the core mold 32 with the cavity mold 34, the retaining pin 33 is inserted into the insert hole 20H formed at the other end face 20c of the wooden member 6, while keeping the shaft center direction A of annual rings 22 of the wooden member aligned with the up-to-down direction. At this time, the tapered retaining pin 33 is inserted and pressed into the insert hole 20H until the end portion of the tapered retaining pin 33 cannot be inserted any further. In this way, the tapered retaining pin 33 can be inserted into the insert hole 20H of the wooden member 6, thereby keeping the wooden member 6 firmly fitted onto the retaining pin 33. Thus, the wooden member 6, which is introduced to the retaining pin 33, may be secured while keeping the shaft center direction A of annual rings 22 of the wooden member aligned with the axial direction H (the up-to-down direction) of the load acting portion. The each side faces 20b of the wooden member 6 are arranged along the up-to-down direction which is a projection direction of the retaining pin 33. Then, the cavity 38 is formed by closing the core mold 32 with the cavity mold 34. The wooden member 6 is disposed in the cavity 38, being retained with the retaining pin 33. In this way, the wooden member 6 can be retained and suspended in a first portion 36 side of the cavity 38 and spaced apart from the surfaces (36a, 36b, 37a, 37b) of the molds surrounding the cavity 38.

[Second Step]

With reference to FIG. 5 to FIG. 7, the first injection openings 41a to 41d positioned at the upper edge side of the wooden member 6 and the second injection openings 42a and 42b positioned at the lower edge side of the wooden member 6 inject the molding materials (WM1, WM2) into the cavity 38 at the second step. That is, the molding materials are injected into the cavity 38 from a position that is radially outside of the peripheral surfaces of the wooden member 6. In the present embodiment, the first injection openings 41a to 41d are positioned in the up-to-down direction at the four corners of the inner-side upper surface 36a, which is offset radially outward from the peripheral surfaces (e.g. side faces 20b) of the wooden member 6. Thus, the molding material WM1 can be injected downward from the first injection openings 41a to 41d without directly contacting the wooden member 6. As a result, the molding material WM1 can also be injected downward along the projection direction (up-to-down direction) of the retaining pin 33. This can prevent the wooden member 6 from becoming misaligned excessively by the injected molding material WM1. The second injection openings 42a and 42b are positioned at the opening-side upper surfaces 37a, which is also offset radially outward from the peripheral surfaces of the wood 6. Thus, the molding material WM2 also can be injected downward from the second injection openings 42a and 42b without directly contacting the wooden member 6 along. In this way, the molding materials WM1 and WM2 can be injected while avoiding direct contact with the wooden member 6. This can prevent excessive deformation of the wooden member 6 by injection pressure of the molding materials WM1 and WM2 as much as possible.

Then, the molding material WM1 injected by the first injection openings 41a to 41d and the molding material WM2 injected by the second injection openings 42a and 42b are merged and contact each side faces 20b of the wooden member 6, as shown in FIG. 7. Each of the side faces 20b of the wooden member 6 are arranged between the one end face 20a and the other end face 20c of the wooden member 6 and extend in the up-to-down direction. The one end face 20a forms the one end of the wooden member 6. The other end face 20c forms the other end of the wooden member 6. For example, adjusting each injection conditions (e.g., injection pressure or injection amount) of the molding materials WM1 and WM2 allows the molding materials WM1 and WM2 to be injected by each injection openings so that the molding materials WM1 and WM2 are merged at each side faces 20b of the wooden member 6.

In this way, when the molding materials WM1 and WM2 are injected by each injection openings 41a to 41d, 42a, and 42b in a balanced manner, the molding materials WM1 and WM2 can be merged at each side faces 20b of the wooden member 6. This can prevent the wooden member 6 from excessively sinking or floating relative to the retaining pin 33 as much as possible. That is, if the retaining pin 33 is firmly inserted into the wooden member 6 under a typical condition for injection molding, the wooden member 6 may none-the-less sink or float due to the injection pressure or the fluid pressure of the molding materials WM1 and WM2. However, if the injection of the molding materials WM1 and WM2 is performed in the balanced manner as described above, the wooden member 6 can be prevented from floating up from or sinking down onto the retaining pin 33. Specifically, a tendency of the wooden member 6 to float off the retaining pin 33 due to a flow of the molding material WM2 from a downward side can be restrained by a flow of the molding materials WM1 from an upward side. On the contrary, a tendency of the wooden member 6 to sink further onto the retaining pin 33 due to the flow of the molding material WM1 from the upward side can be restrained by the flow of the molding materials WM2 from the downward side. Thus, the injection molding can be done under the condition that the wooden member 6 does not excessively sink or float in the cavity 38. In this way, the wooden member 6 can be kept at an appropriate float state. As a result, the resin cover member 4 can be formed to cover the wooden member 6 successfully. Thus, the cover member 4 formed as described above has a weldline WL that is a merging portion of the molding materials WM1 and WM2. In other words, the weldline WL is formed at a portion of the cover member 4 that corresponds to the side faces 20b of the wooden member 6

Further, the injection conditions (e.g., injection pressure or injection amount) of the molding materials WM1 and WM2 can be set to fulfill requirements mentioned above. However, the injection conditions of the molding materials WM1 and WM2 may be intentionally made different. For example, the total injection amount of the molding material WM1 injected by the first injection openings 41a to 41d may be preferably increased, relatively in to the present embodiment to form adequately a load acting portion 10 having relatively thin walls, shown in FIG. 3. The load acting portion 10 illustrated in FIG. 3 is molded at a cavity portion of the first portion 36 side, as shown in FIG. 7. The thickness dimension of this cavity portion is narrower than that of the second portion 37. Thus, if the total injection amount of the molding material WM1 relatively increases, the molding material WM1 can be fully spread throughout the cavity portion of the first portion 36 side. Thus, even if the cavity portion of the first portion 36 side is relatively narrow, increasing the relative injection amount of the molding material WM1 would prevent defective moldings of the load acting portion 10 due to an insufficient supply of the molding material WM1 as much as possible.

Subsequently, the core mold 32 and the cavity mold 34 are opened, and the cover member 4 and the wooden member 6 are removed from the retaining pin 33. Then the vehicle member 2 shown in FIGS. 1 to 4 can be obtained. With reference to FIG. 4, a through hole is formed at a position the back surface of the attaching portion 12. This position of the attaching portion 12 corresponds to the arrangement position of the retaining pin 33. The insert hole 20H of the wooden member 6 is exposed through the through hole. For example, if the through hole of the back surface of the attaching portion 12 is covered with the other member, such as a cap, the exposure of the wooden member 6 through the cover member 4 may be completely prevented. However, if the exposure is not excessive, the exposure may be left as it is. With reference to FIG. 2, for example, the back surface of the attaching portion 12 is covered with a front flange portion 5r, described below, in the present embodiment. Thus, the wooden member 6 is not excessively exposure to the outside via the through hole. That is, the front flange portion 5r serves as the cap and thus the through hole of the back surface of the attaching portion 12 may be left as it is.

MODIFICATION

The composition of the injection molding machine may be different than that mentioned above. With reference to FIG. 8, for example, retaining pins (the retaining pin 33, a first auxiliary retaining pin 33a and a second auxiliary retaining pin 33b of the first embodiment) are disposed at the core-side closure surface 32a of the core mold 32 for the present modification. The first auxiliary retaining pin 33a and second auxiliary retaining pin 33b have substantially the same configuration as the retaining pin 33, except that the first auxiliary retaining pin 33a and the second auxiliary retaining pin 33b are smaller than the retaining pin 33. Further, the first auxiliary retaining pin 33a and the second auxiliary retaining pin 33b are disposed on the core-side closure surface 32a of the core mold 32 radially away from the retaining pin 33. In the present modification, the first auxiliary retaining pin 33a and the second auxiliary retaining pin 33b are positioned symmetrically with respect to the retaining pin 33. At the first step, the wooden member 6 is introduced onto and positioned on the retaining pin 33. Subsequently, the wooden member 6 is introduced onto and positioned on the first auxiliary retaining pin 33a and the second auxiliary retaining pin 33b, which are arranged radially outside of the retaining pin 33. The first auxiliary retaining pin 33a and the second auxiliary retaining pin 33b may be inserted into corresponding other insert holes 21H of the wooden member 6. In this way, rotation of the wooden member 6 about the retaining pin 33 in the present modification is restricted by the other retaining pins 33a, 33b. Thus, the wooden member 6 can be retained in the cavity 38 in a more appropriate condition.

[Attachment Operation of the Vehicle Member]

With reference to FIG. 2, the vehicle members 2 are attached between the bumper reinforcement member 2r and the right and left side members 4r and 6r. When the vehicle members 2 are attached between the bumper reinforcement member 2r and right and left side members 4r and 6r respectively, the axial direction H of the load acting portion, which is the "input direction of the load" at the time of attachment to the vehicle, is aligned in the front-to-rear direction.

The bumper reinforcement member 2r is a flat plate or prism-shaped member that extends in the left-to-right direction, which is the vehicle-width direction, at the front of the vehicle. The right and left side members 4r and 6r are prism-shaped members arranged separately so as to have a space in the vehicle-width direction at the bottom surface of the vehicle. Additionally, the right and left side members 4r and 6r extend in front-to-rear direction of the vehicle at the rear of the bumper reinforcement member 2r. The right side member 4r has the front flange portion 5r at its front edge. Further, the left side member 6r has the front flange portion 7r at its front edge. The front flange portions 5r and 7r are substantially rectangular flat plate portions, when viewed from the front. The front flange portions 5r and 7r can be disposed at the attaching portions 12 and to face rear-side faces of the attaching portions 12. Additionally, each of the front flange portions 5r and 7r has fastener holes (not illustrated) positioned to correspond to each of the fastener holes 12H of the attaching portions 12.

Positional alignment between the fastener holes of the front flange portion 5r and the fastener holes 12H of the attaching portion 12 is performed while attaching the attaching portion 12 of the vehicle member 2 to the front flange portions 5r of the right side member 4r. In each of the aligned fastener holes, bolt materials BM as fasteners can be inserted, thereby allowing smooth and stable attachment of the vehicle member 2 to the front edge of the right side member 4r. According to the same procedure, the attaching portion 12 of another vehicle member 2 can be fastened and fixed to the front flange portion 7r of the left side member 6r. In this way, the vehicle member 2 can be attached to the front edge of the left side member 6r. Subsequently, front portion of the vehicle members 2 are fixed to a rear surface of the bumper reinforcement member 2r. As a result, each of the vehicle members 2 can be disposed between the bumper reinforcement member 2r and the right and left side members 4r and 6r. Additionally, the load acting portion 10 may be disposed in a hollow crash box (not illustrated), and the crash box may be fixed to the rear surface of the bumper reinforcement member 2r.

[Behavior of the Vehicle Members]

With reference to the FIG. 2, the impact load F applied to the bumper reinforcement member 2r in a vehicle crash can be received by the right and left vehicle members 2. Then, the wooden member 6 disposed in the cover member 4 can absorb the impact load F by collapsing in the axial direction H of the load acting portion. In this embodiment, the wooden member 6 is disposed in the load acting portion 10 appropriately, as illustrated in FIG. 3, so that the shaft center direction A of the annual rings 22 is along the axial direction H of the load acting portion, which is the input direction of the load. Thus, the wooden member 6 can receive enough of the impact load F and appropriately absorb the impact load F. Additionally, the flange shape attaching portions 12 extends outward from each of the acting portion side faces 10b of the load acting portion 10. Further, the attaching portions 12 are fixed to the corresponding front flange portions 5r and 7r. Thus, the attachment stability to the side members 4r and 6r can be improved by the flange shape attaching portions 12. This can prevent misalignment (for example, misalignment in the up-to-down or left-to-right direction) of the load acting portion 10 and the wooden member 6 due to the impact load F. Thus, the wooden member 6 disposed in the cover member 4 can be collapsed substantially straight along the axial direction H of the load acting portion 10 during a vehicle crash.

As described above, the wooden member 6 is disposed in the load acting portion 10 appropriately so that the shaft center direction A of the annual rings 22 is along the input direction of the load. Thus, the wooden member 6 disposed in the load acting portion 10 can receive and absorb the impact load F. At this time, the use of relatively low density wooden member 6 can improve the impact absorption efficiency of the vehicle member 2 suitably. The attaching portions 12 are integrally formed with the load acting portion 10, thereby improving attachment to the vehicle. Especially in the present embodiment, the attaching portions 12 have the flange shape extending outward from the outer peripheral surfaces (each the acting portion side faces 10b) of the prism-shape load acting portion 10. In this way, the attaching portions 12 have an appropriate shape that can improve the attachment stability of the vehicle member 12 to the attached members (4r and 6r). This can prevent, for example, misalignment of the load acting portion 10 and allows the load acting portion 10 to receive the impact load appropriately during the vehicle crash. According to the present embodiment, the wooden member 6 can be disposed in the cover member 4 appropriately. Additionally, the attachment of the vehicle member 2 to the vehicle can be improved. Furthermore, covering the wooden member 6 with the resin cover member 4 can avoid performance degradation of the wooden member 6 due to the change in the usage environment and can reduce the weight of the vehicle members 2.

Second Embodiment

In the second embodiment, a detailed description of the basic composition that is substantially the same as described in the first embodiment is omitted by, for example, using the corresponding reference numerals. With reference to FIG. 9, the second embodiment is different from the first embodiment in that a vehicle member 2A is disposed in a side door DM. Additionally, the vehicle member 2A is used as a load transmission member transmitting an impact load F when a vehicle crash happens. The vehicle member 2A is disposed in the side door DM so that an axial direction H of the load acting portion is aligned in the left-to-right direction, as described below.

The vehicle member 2A has the cover member 4 and the wooden member 6. The cover member 4 has the square prism-shaped load acting portion 10 and the flange shape attaching portion 12 extending outward from the outer peripheral surfaces (acting portion surfaces) of the load acting portion 10. The attaching portion 12 is provided at a center of the load acting portion 10 in the axial direction H (a center in the left-to-right direction in FIG. 9). The load acting portion 10 has an upper portion that projects leftward like eave at its left edge. The left edge of the load acting portion 10 can be positioned at an upper surface of an impact beam 8d, described below. The wooden member 6 is disposed in the load acting portion 10 so that the shaft center direction of the annual rings (not illustrated) is substantially aligned with the axial direction H, as described in the first embodiment. When the vehicle member 2A is used as the load transmission member, a high-density wooden member 6, which is excellent for its load transmitting efficiency, is preferably used. For example, the density of the wooden member 6 may range preferably from $0.6/cm^3$ to $1.0 \text{ g/cm}^3$. If a wooden member 6 having relatively low density is used instead, the desired load transmitting efficiency can be obtained by increasing the cross-sectional area of the wooden member 6, thereby making the wooden member 6 have a higher strength.

The side door DM is disposed at a left side of the rear portion of the vehicle body. The side door DM has an outer panel 2d located at the outside of the vehicle, an inner panel 4d located at the vehicle inside, and a door trim 6d located on the vehicle interior side. Each of the outer panel 2d, the inner panel 4d, and the door trim 6d is separated at appropriate intervals in the left-to-right direction. Between the outer panel 2d and the inner panel 4d, the impact beam 8d is disposed. The impact beam 8d is a pipe material that extends in the front-to-rear direction. The impact beam 8d extends so as to traverse vehicle seats (not illustrated) located in the vehicle interior in the front-to-rear direction and is fixed to the side door DM. Further, a reinforcement member 10d is provided at the inside of the door trim 6d. The reinforcement member 10d is positioned at positions corresponding (not illustrated) to the vehicle seats.

In the present embodiment, the vehicle member 2A is disposed in the side door DM so that the axial direction H of the load acting portion is aligned with the left-to-right direction, which is the "input direction of the load" when the vehicle member 2A is attached to the vehicle. That is, the load acting portion 10 is inserted into an insert hole formed at the inner panel 4d so that the axial direction H of the load acting portion is aligned with the left-to-right direction. In this way, the load acting portion 10 is disposed between the impact beam 8d and the reinforcement member 10d. Then, the attaching portion 12 of the vehicle member 2A is fastened and fixed to a flat plate attaching portion 5d provided at the inner panel 4d, which may correspond to the attached member in the present disclosure. If an impactor (not illustrated) collides with the outer panel 2d of the side door DM, the impact beam 8d can reduce deformation of the side door DM towards the vehicle interior. At the same time, the vehicle member 2A, functioning as the load transmission member, can transmit the impact load to the reinforcement member 10d disposed inside the vehicle from the door trim 6d. Further, the wooden member 6 is appropriately disposed so that the shaft center direction of the annual rings is aligned with the axial direction H of the load acting portion in the present embodiment. Thus, the wooden member 6 can adequately receive the impact load F and appropriately transmit the impact load F.

Test Examples

The present embodiment is described below based on test examples. However, the present disclosure is not intended to be limited to these test examples. In each examples, a square prism-shaped wooden members having compositions shown in a [Chart 1], described below, were used for intended purposes. The moisture content of the wooden members were set around 10%. Densities and compressive loads of the wooden members were calculated using "JISZ2101: 2009 test method for wooden member." The cover members (resin: polypropylene; thickness of the load acting portion: 1.5 mm, thickness of the attaching portion: 4 mm) were integrally molded with each wooden members via the aforementioned first step and the second step, and by using the injection molding machine illustrated in FIG. 5. In this way, the vehicle members described in each examples were manufactured. The temperature of a cylinder used to heat the molding material was set to 220° C. Additionally, the injection pressure of the each injection openings were set to 20 MPa. Further, the holding pressure of the each injection openings were set to 20 MPa. Furthermore, the cooling time was set to 45 seconds.

[Impact Test of the Load Transmission Member]

An impactor of 80 kg was hit against the vehicle members of second example and third example at the speed of 4.4 km/h and along the axial direction of the load acting portion. The vehicle members were then visually inspected for damage. When the external shape of the vehicle member remained almost unchanged and the wooden members did not collapsed, the vehicle member was evaluated as not being destroyed, indicated as "◯" below. On the other hand, when the vehicle members were damaged and the wooden member collapsed, the vehicle member was evaluated as being destroyed, indicated as "x" below.

CHART 1

| | Intended use | Dimensions (mm) | | | Density |
|---|---|---|---|---|---|
| | (Tree species) | L | W | H | (g/cm³) |
| First Example | Impact absorption member (Cedar) | 60 | 60 | 70 | 0.35 |
| Second Example | Load transmission member (Cedar) | 50 | 55 | 80 | 0.35 |
| Third Example | Load transmission member (Beech) | 70 | 70 | 90 | 0.60 |

CHART 2

| | Compressive load (kN) | Necessary load (kN) | Results of Impact test |
|---|---|---|---|
| First Example | 126 | 120 | — |
| Second Example | 96 | 40 | ◯ |
| Third Example | 172 | 30 | ◯ |

RESULTS AND DISCUSSION

By setting appropriately the cross-sectional area of the wooden member as described above, the vehicle member of the first example 1 was able to receive an appropriate compressive load (within ±10 kN of the necessary load) to function as an impact absorption member. This benefit seems to result from arranging the wooden member in the load acting portion of the cover member so that the shaft center direction of the annual rings is aligned with the input direction of the load. If the compressive load of the vehicle member significantly exceeds the necessary load, the back side members (e.g., the side members 4r and 6r illustrated in FIG. 2) may deform and thus the vehicle member would not be able to serve as an impact absorption member. Consequently, when the vehicle member is used as the impact absorption member, the cross-sectional area of the wooden member can also be adjusted to obtain a compressive load that is close to the necessary load.

Also with regards to the vehicle members of the second and third examples, by setting the cross-sectional area of the wooden members adequately, the vehicle members have an appropriate compressive load, which significantly exceeds the necessary load, to function as load transmission members. In the second and third examples, the vehicle member is designed to transmit the load to other members (e.g., the reinforcement member 10d illustrated in FIG. 9) without collapsing. Thus, the cross-sectional areas of the wooden members is adjusted such that the compressive load is larger than the necessary load. As a result, both of the second and third examples were evaluated as "○" in the impact test, and thus, both vehicle members have been confirmed to be appropriate for use as load transmission members.

The vehicle members of the present embodiment are not intended to be limited to the embodiments described above and may take forms of various other embodiments. Although compositions (e.g., shape, dimension, position, and number of arrangement) of the vehicle members 2 and 2A are exemplified in the present embodiment, the compositions of the vehicle members 2 and 2A are not intended to be limited to the above embodiments. For example, the location of the vehicle member may be between the bumper reinforcement member and the side members or may be in the side door. However, the vehicle members may be disposed at various other vehicle portions, such as the vehicle front, sides, rear, bottom, and/or interior.

Further, although the square prism-shaped load acting portion 10 and flange shaped attaching portion 12 are exemplified in the above embodiments, the compositions (e.g., shape, dimension, and formation location) of the each portions are not intended to be limited to these embodiments. For example, the load acting portion may have various pillar shapes other than a square prism, depending on the intended use of the vehicle member or the external shape of the wooden member. Furthermore, the load acting portion is not necessarily formed with a similar shape to the shape of the wooden member and may have various shapes other than a prism shape. The attaching portion may have various shapes other than a flange shape. For example, the attaching member may be a flat plate having a substantially U-shaped or L-shaped cross section. Additionally, the attaching portion may extend in the appropriate direction (for example, at least one of the W direction and the L direction) from the outer peripheral surfaces of the load acting portion. Further, the flange shaped attaching portion may extend in the axial direction of the load acting portion. The outer peripheral surfaces of the load acting portion may include the input end face and a bottom end face located opposite to the input end face. The attaching members may be attached to the attached members using various methods, not only fastening but also bonding, locking, or inserting. For example, J-shaped hook portions or arrowhead-shaped projecting portions may be formed at the attaching members. Then, the hook portion may be locked in the attached member. Alternatively, the projecting portions may be inserted into the holes of the attached members. Additionally, the attaching members may be formed at various positions of the load acting portion. For example, the load acting portion may be disposed between a pair of the attaching portions. Furthermore, a part of the thickness dimension of the load acting portion may be larger than the thickness dimension of the attaching portion.

Although compositions of the wooden member 6 (e.g., shape, dimension, location, and number of arrangement) are exemplified in the present embodiment, the compositions are not intended to be limited to the embodiment. For example, the wooden member 6 may have various other shapes, not only a square-prism shape, including a pillar shape, cylindrical shape, or plate shape. Alternatively, more than one wooden members may be disposed in the load acting portion. The shaft center direction of the annual rings of the wooden member in the load acting portion may be changed depending on the anticipated input direction of the load. Further, the shaft center direction of the wooden member in the load acting portion may not align with the axial direction of the load acting portion.

The attached member may be adjusted depending on the composition or the position of the vehicle member. The attached member may include a positioning projection(s) that may be inserted into the though hole(s) (the though holes formed along the retaining pin) formed at the back surfaces of the attaching portions. Before the vehicle member is fixed to the attached member, the position of the vehicle member relative to the attached member can be properly aligned by inserting the positioning projection(s) into the through hole(s). Alternatively, through holes may be formed in the vehicle member to align with the retaining pin and the auxiliary retaining pins. Additionally, the positioning projections corresponding to the through holes of the vehicle member may be formed in the attached member. In this way, the vehicle member can be positioned more appropriately relative to the attached member.

Although the manufacturing method of the vehicle member 2 is exemplified in the present embodiment, the vehicle member 2 may be manufactured using other various method. Further, the compositions of the injection molding machine (the retaining pin or each injection openings) may be changed accordingly.

The invention claimed is:

1. A vehicle member for absorbing or transmitting a received load, comprising:
    a wooden member; and
    a resin cover member integrally formed and covering the wooden member,
    wherein the resin cover member integrally includes a load acting portion and an attaching portion being attachable to an attached portion within a vehicle,
    wherein the wooden member is positioned within the load acting portion so that a shaft center direction of annual rings of the wooden member is aligned with an input direction of a load; and
    wherein the wooden member closely contacts opposite sides of the load acting portion in a direction perpendicular to the shaft center direction of the annual rings.

2. The vehicle member according to claim 1, wherein:
    the load acting portion has a pillar shape extending in the input direction of the load,
    the attaching portion has a flange shape extending outward from outer peripheral surfaces of the load acting portion.

3. The vehicle member according to claim 1, wherein the wooden member has a density ranging from 0.2 g/cm$^3$ to 0.6 g/cm$^3$.

4. The vehicle member according to claim 1, wherein the wooden member has a density ranging from 0.6 g/cm$^3$ to 1.0 g/cm$^3$.

5. A vehicle member for absorbing or transmitting a received load, comprising:
    an attaching portion;
    a load acting portion extending from the attaching portion along a force receiving axis;
    a wooden member located within the load acting portion; and
    wherein fibers of the wooden member primarily extend in a direction parallel to the force receiving axis; and
    wherein the wooden member closely contacts opposite sides of the load acting portion in a direction perpendicular to the force receiving axis.

6. The vehicle member according to claim 5, further comprising a side member aligned with the wooden member along the direction in which the fibers primarily extend.

7. The vehicle member according to claim 5, further comprising a reinforcement member aligned with the wooden member in the direction in which the fibers primarily extend.

8. A vehicle member for absorbing or transmitting a received load, comprising:
- a wooden member; and
- a cover member integrally formed and covering the wooden member, the cover member including a load acting portion primarily extending in an axial direction and an attaching portion;
- wherein the wooden member is positioned within the load acting portion so that a shaft center direction of annual rings of the wooden member is aligned with the axial direction of the load acting portion; and
- wherein the wooden member closely contacts opposite sides of the load acting portion in a direction perpendicular to the shaft center direction of the annual rings.

* * * * *